United States Patent
Myers et al.

(10) Patent No.: US 7,966,822 B2
(45) Date of Patent: Jun. 28, 2011

(54) REVERSE-FLOW GAS TURBINE COMBUSTION SYSTEM

(75) Inventors: Geoffrey David Myers, Simpsonville, SC (US); Thomas Edward Johnson, Greer, SC (US); Stefan Maier, Greer, SC (US); Stanley Kevin Widener, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1273 days.

(21) Appl. No.: 11/160,596

(22) Filed: Jun. 30, 2005

(65) Prior Publication Data

US 2007/0022758 A1    Feb. 1, 2007

(51) Int. Cl.
*F02C 1/00* (2006.01)

(52) U.S. Cl. .............. 60/758; 60/760; 60/772

(58) Field of Classification Search ........ 60/737, 60/738, 732, 752–760, 776
See application file for complete search history.

(56) References Cited

U.S. PATENT DOCUMENTS

| | | | | |
|---|---|---|---|---|
| 2,922,279 A | * | 1/1960 | Roberson et al. | 60/736 |
| 2,930,192 A | * | 3/1960 | Johnson | 60/746 |
| 3,608,309 A | * | 9/1971 | Hill et al. | 60/748 |
| 3,831,854 A | * | 8/1974 | Sato et al. | 239/406 |
| 4,040,252 A | * | 8/1977 | Mosier et al. | 60/804 |
| 4,211,073 A | * | 7/1980 | Guillot | 60/746 |
| 4,474,014 A | * | 10/1984 | Markowski | 60/738 |
| 4,549,402 A | | 10/1985 | Saintsburry et al. | |
| 4,628,687 A | * | 12/1986 | Strom | 60/39.23 |
| 4,719,748 A | * | 1/1988 | Davis et al. | 60/39.37 |
| 4,944,152 A | * | 7/1990 | Shekleton | 60/804 |
| 5,255,742 A | | 10/1993 | Mikus | |
| 5,404,952 A | | 4/1995 | Vinegar | |
| 5,515,680 A | | 5/1996 | Fujimura et al. | |
| 5,862,858 A | | 1/1999 | Wellington et al. | |
| 5,899,269 A | | 5/1999 | Wellington et al. | |
| 6,019,172 A | | 2/2000 | Wellington et al. | |
| 6,269,882 B1 | | 8/2001 | Wellington et al. | |
| 6,599,119 B1 | | 7/2003 | Wood et al. | |
| 6,752,620 B2 | | 6/2004 | Heier et al. | |
| 2004/0011055 A1 | * | 1/2004 | Inoue et al. | 60/776 |

FOREIGN PATENT DOCUMENTS

GB    2124747    *    2/1984

OTHER PUBLICATIONS

Title: Ultralow-Nox Combustor for Nonpremixed & Premixed Gaseous and Liquid Fuels; Authors: Yedidia Neumeir, et al.; ASME Technical Publication GT2005-69118; 1 pg.
Title: Laseroptical Investigation of Highly Preheated Combustion with Strong Exhaust Gas Recirculation; Twenty-Seventh Symposium (International) on Combustion/The Combustion Institute; Authors: Tobias Plessing, et al.; date 1998, pp. 3197-3204.
AFRC-JFRC International Combustion Symposium; Title: Flameless Combustion or Stagnation Point Reverse Flow Combustor (SPRFC); Authors: Zinn, et al.; Dated: Oct. 11, 2004; pp. 1-7.
Proceedings of GT2005, ASME Turbo Expo 2005: Power for Land, Sea & Air; Title Fundamental of Low-NOX Gas Turbine Adiabatic Combustor; Authors: Levy, et al; Date: 2005; pp. 1-11.

* cited by examiner

*Primary Examiner* — William H Rodríguez
*Assistant Examiner* — Gerald L Sung
(74) *Attorney, Agent, or Firm* — Sutherland Asbill & Brennan LLP

(57) ABSTRACT

A gas turbine combustion system for burning air and fuel into exhaust gases. The gas turbine combustion system may include a combustor, a turbine nozzle integral with the combustor for providing the air to the combustor, and a fuel injector for providing the fuel to the combustor. The turbine nozzle and the fuel injector are positioned within the combustor such that a mixture of the air and the fuel flows in a first direction and the exhaust gases flow in a second direction.

17 Claims, 6 Drawing Sheets

REVERSE-FLOW GAS TURBINE COMBUSTION SYSTEM

TECHNICAL FIELD

The present invention relates generally to gas turbine combustion engines and relates more particularly to a reverse-flow gas turbine combustion system with an integral first stage turbine nozzle.

BACKGROUND OF THE INVENTION

Generally described, gas turbine engines include a compressor for compressing air, a combustor for mixing the compressed air with fuel and igniting the mixture, and a turbine blade assembly for producing power. Known turbine engines have developed into highly complex and sophisticated devices. For example, known turbine combustor systems alone may require more than 14,000 parts.

Another issue with known gas turbine engines is promoting operation at high efficiency without producing undesirable air emissions. The primary air emissions usually produced by gas turbine engines include nitrogen oxides (NOx). Lean premixed combustors also have a susceptibility to dynamics that can cause catastrophic damage or accelerated wear in current dry, low emissions combustion systems.

There is a desire, therefore, for a gas turbine engine with increased reliability, efficiency, and performance. Preferably, the number and size of the parts of the gas turbine engine can be reduced while maintaining or improving on performance and emissions output.

SUMMARY OF THE INVENTION

The present application thus describes a gas turbine combustion system for burning air and fuel into exhaust gases. The gas turbine combustion system may include a combustor, a turbine nozzle integral with the combustor for providing the air to the combustor, and a fuel injector for providing the fuel to the combustor. The turbine nozzle and the fuel injector are positioned within the combustor such that a mixture of the air and the fuel flows in a first direction and the exhaust gases flow in a second direction.

The second direction may be the reverse direction to the first direction. The combustor may include a reverse flow annular combustor. The turbine nozzle may include a stage one nozzle. The combustor may include one or more reaction zones and one or more stagnation points. The turbine nozzle and the fuel injector may be positioned about a tube within the combustor. The combustor may include two reverse turns for the exhaust gases. A number of fuel injectors may be used. An impingement sleeve may be positioned about the combustor.

An airflow channel may be positioned about the combustor. Air may flow through the airflow channel in a reverse direction to the exhaust gases in the second direction. The airflow channel may lead to one or more intake channels positioned within the combustor. The fuel injector may be positioned within one of the intake channels. The airflow channel may lead to one or more turbine plenums. An impingement/film cooling sleeve may be positioned about the airflow channel.

The present application further describes a gas turbine combustion system for burning air and fuel into exhaust gases. The gas turbine combustion system may include a reverse flow combustor, a turbine nozzle integral with the combustor for providing the air to the combustor, a fuel injector for providing the fuel to the combustor, and a cooling airflow channel positioned about the combustor. The cooling airflow channel may include an impingement sleeve positioned about the combustor. Air flows through the airflow channel in a reverse direction to an exhaust gases direction.

The present application further describes a method for burning air and fuel into exhaust gases in a gas turbine combustion system. The method may include injecting an air stream into a combustor in a first direction, injecting a fuel stream into the combustor in the first direction, reacting the air stream and the fuel stream in a reaction zone to create the exhaust gases, and reversing the flow of the exhaust gases in a second direction so as to exit the combustor.

These and other features of the present invention will become apparent to one of ordinary skill in the art upon review of the following detailed description of the preferred embodiments when taken in conjunction with the drawings and appended claims.

DETAILED DESCRIPTION

Figure 1:
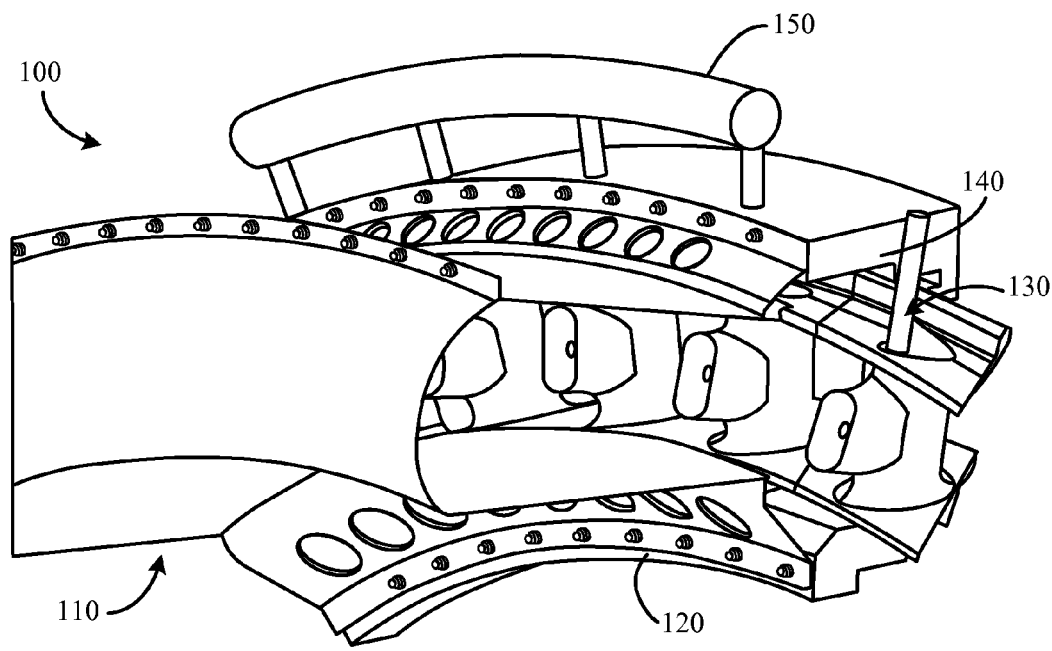
FIG. 1 is a perspective view of a combustor with an integral turbine nozzle as is described herein.
Figure 2:
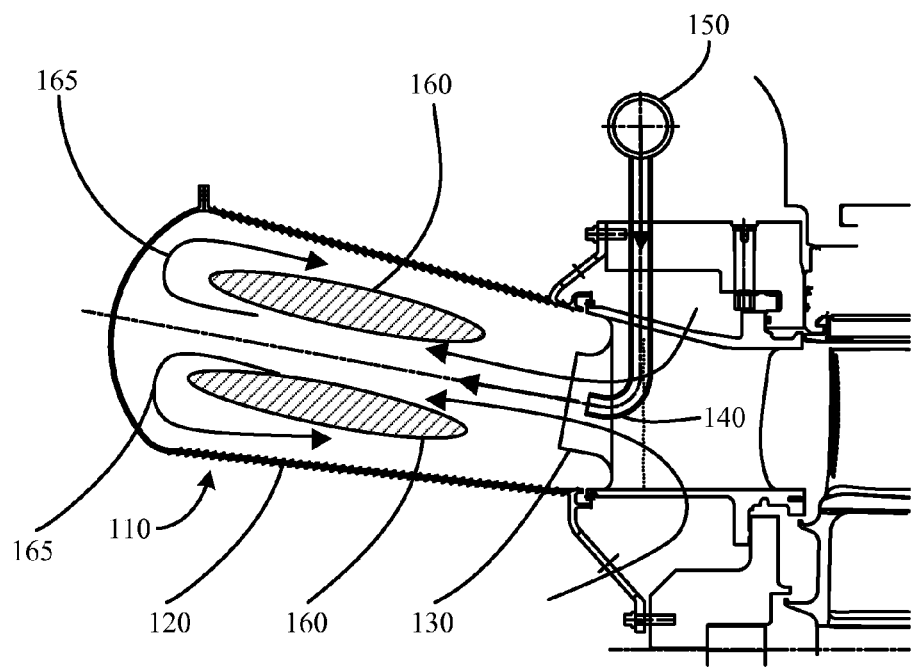
FIG. 2 is a side cross-sectional view of the combustor with the integral turbine nozzle of FIG. 1.

Referring now to the drawings, in which like numerals refer to like elements throughout the several views, FIGS. 1 and 2 show a combustion system 100 as is described herein. The combustion system 100 includes a combustor 110. As will be described in more detail below, the combustor 110 may be a reverse flow annular combustor. The combustor 110 includes an annular combustor liner 120. The liner 120 shapes the flow field to provide the reverse flow.

The combustion system 100 includes a turbine nozzle 130 that is integral with the combustor 110. In this example, the turbine nozzle 130 is a stage-one nozzle. Other designs also may be used herein. The turbine nozzle 130 supplies air for combustion and for cooling. The nozzle 130 also may be cooled via a flow of the fuel.

The combustion system 100 further includes a fuel injector 140. In this example, the fuel injector 140 is positioned within the turbine nozzle 130 and is integral therewith. The fuel injector 140 may be in communication with a manifold 150 so as to deliver the fuel thereto.

As is shown in FIG. 2, the fuel and the air are injected into a reaction zone 160 within the combustor 110. The fuel and the air are injected in a direction opposite to the direction that the hot combustion products exit, thus creating a stagnation point 165 in the reaction zone 160. This stagnation point 165 creates a high shear counter flow between the incoming fresh mixture and the outgoing combustion products. In this example, the fuel and the combustion air are injected in a co-flow manner via the concentric tubes of the turbine nozzle 130 and the fuel injector 140. Concentric elongated ducts and similar structures also may be used. The fuel and the air streams also can be premixed prior to injection.

Figure 3:
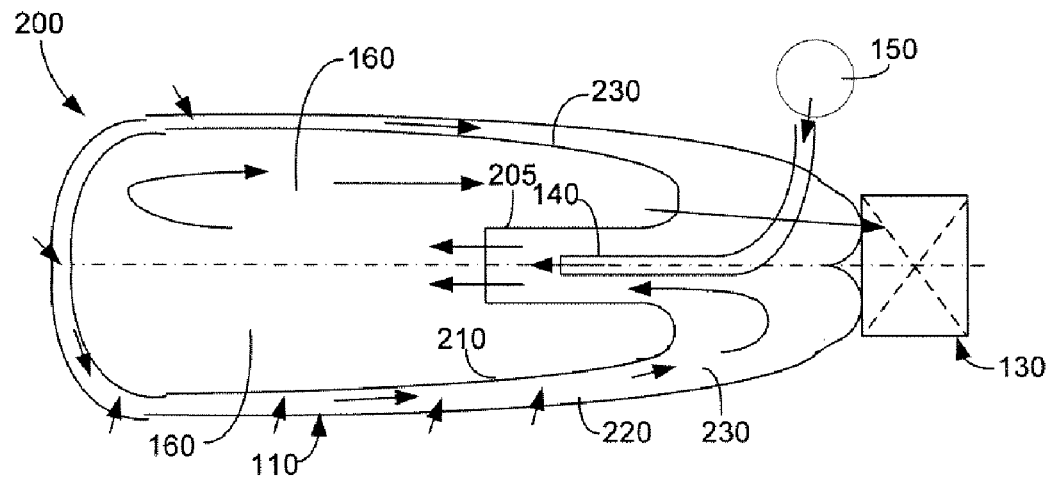
FIG. 3 is a side cross-sectional view of a combustor with an integral turbine nozzle showing a single tube, vane fed injection system.

FIG. 3 show a combustion system 200 that is a further embodiment as is described herein. The combustion system 200 provides a single tube, vane fed injection system. The combustion system 200 includes the combustor 110, the turbine nozzle 130, and the fuel injector 140. The fuel injector 140 is positioned within a tube 205. The turbine nozzle 130 also is in communication with the tube 205 so as to provide a co-flow as described above. The combustion process produces the reaction zones 160, the stagnation points 165, and the reverse flows as described above.

The combustion system 200 also provides for air/fuel cooling. The combustion system 200 may include a liner 210. The liner 210 is similar to the liner 120 described above but may be cooled by impingement and/or convection. The liner 210 may be positioned within an impingement sleeve 220 so as to create an airflow channel 230. Air passes through the impingement sleeve 220 and into the airflow channel 230. The air is directed over the liner 210 about the reaction zones 160 for cooling of both the liner 210 and the turbine nozzle 130. Alternatively, air also may be delivered from the gas turbine compressor (not shown) and may be directed into the airflow channel 230. Flow turning or swirl vanes may be used in the airflow channel 230. After the air passes through the airflow channel 230, the air passes through the turbine nozzle 130 at the hub side and the shroud side so as to cool the vanes and airfoil surfaces of the nozzle 130 by enhanced convection. The fuel supplied to the turbine nozzle 130 also may be used to cool parts of the nozzle 130 prior to being injected into the reaction zones 160.

Figure 9A:
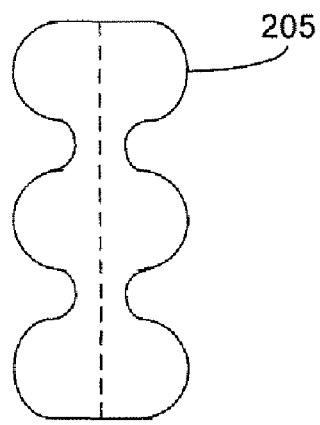
FIGS. 9A-9E are cross-sectional views of several vane embodiments.
Figure 9B:
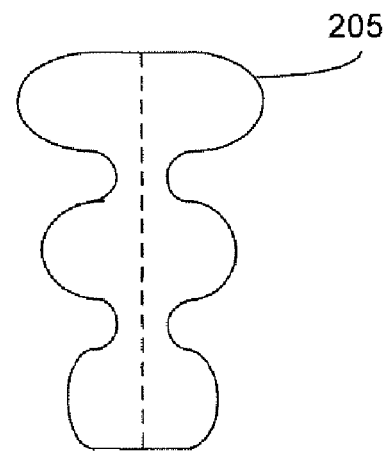
Figure 9C:
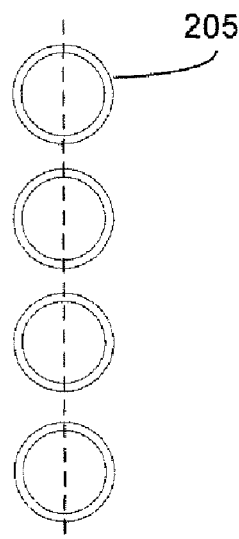
Figure 9D:
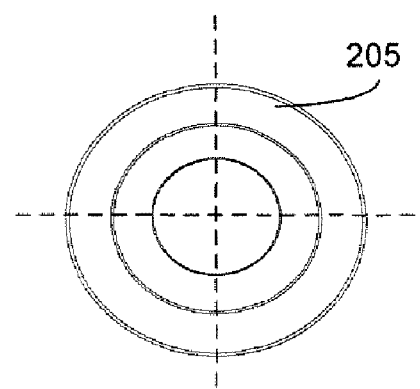
Figure 9E:
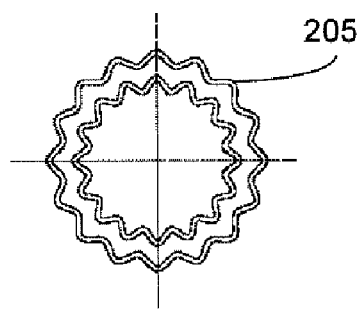

The tube 205, also known as a vane, can take any desired shape. FIGS. 9A-9E show various vane configurations. Each tube 205 may be designed for enhanced interaction between the combustion air and fuel. FIGS. 9D and 9E show concentric tube type geometries.

Figure 4:
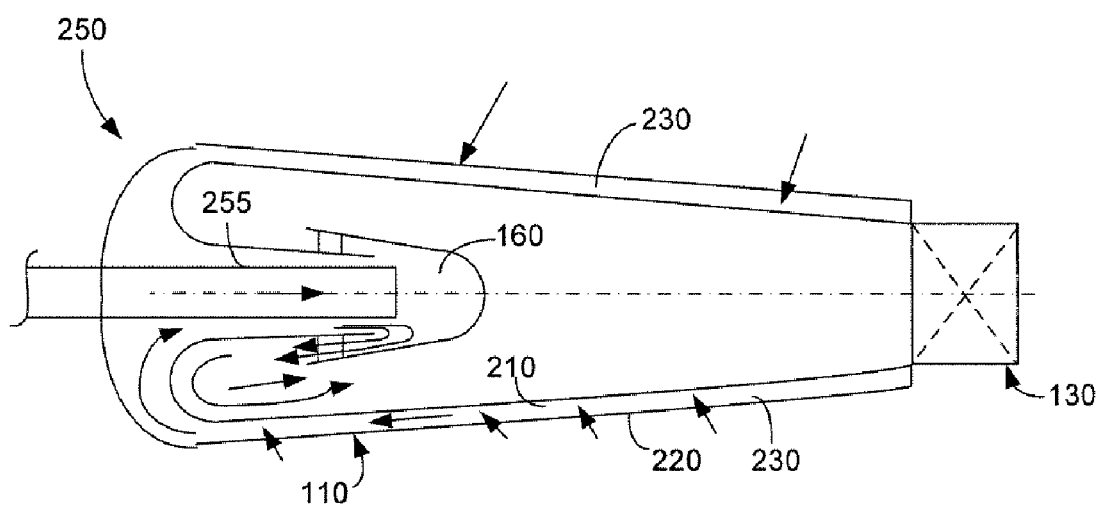
FIG. 4 is a side cross-sectional view of a combustor with an integral turbine nozzle showing a forward insert nozzle system.

FIG. 4 shows a combustion system 250 that is a further embodiment as is described herein. The combustion system 250 provides a forward mounted fuel injector. The combustion system 250 includes the combustor 110, the turbine nozzle 130, the liner 210, the impingement sleeve 220, and the airflow channel 230 as described above. In this example, however, a fuel injector 255 is now positioned at the front of the combustor 110. As before, the fuel and the air are injected into the combustor 110 and form the reaction zones 160. In this example, the exhaust gases take two reverse turns before exiting the combustor 110. The incoming air again travels in a direction opposite the exhaust flow so as to provide cooling.

Figure 5:
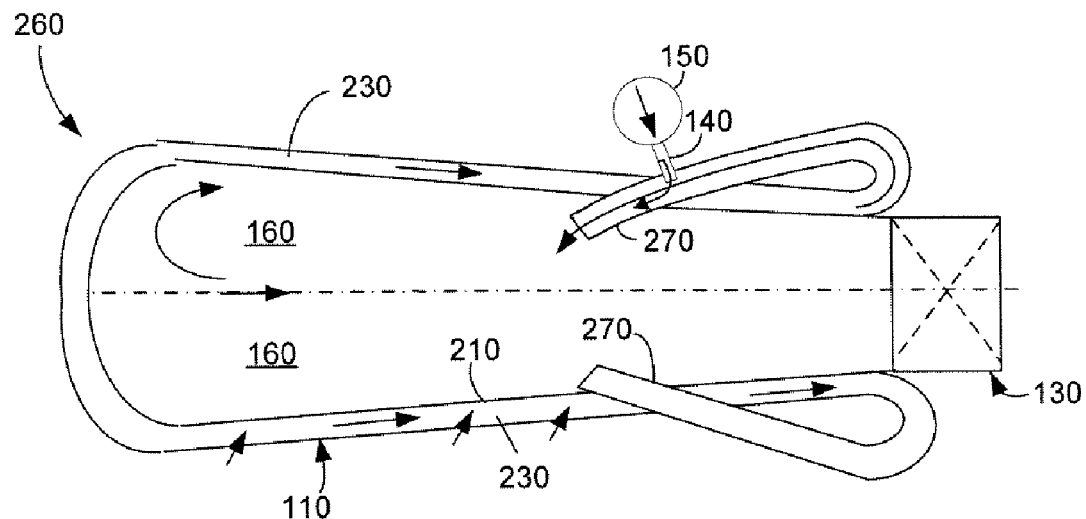
FIG. 5 is a side cross-sectional view of a combustor with an integral turbine nozzle showing a multi-tube, aft fed injection system.

FIG. 5 shows a combustion system 260 that is a further embodiment as is described herein. The combustion system 260 provides for a multi-tube, aft-fed injection system. The combustion system 260 includes the combustor 110, the turbine nozzle 130, the liner 210, the impingement sleeve 220, and the airflow channel 230 as described above. In this example, the fuel injector 140 is positioned on one side of the combustor 110 while the airflow channel 230 leads to a pair of intake air channels 270 positioned about the combustor 110.

The fuel flows and the air flows are directed towards and ignite within the reaction zones 160. The dual fuel flows also may be used herein.

Figure 6:
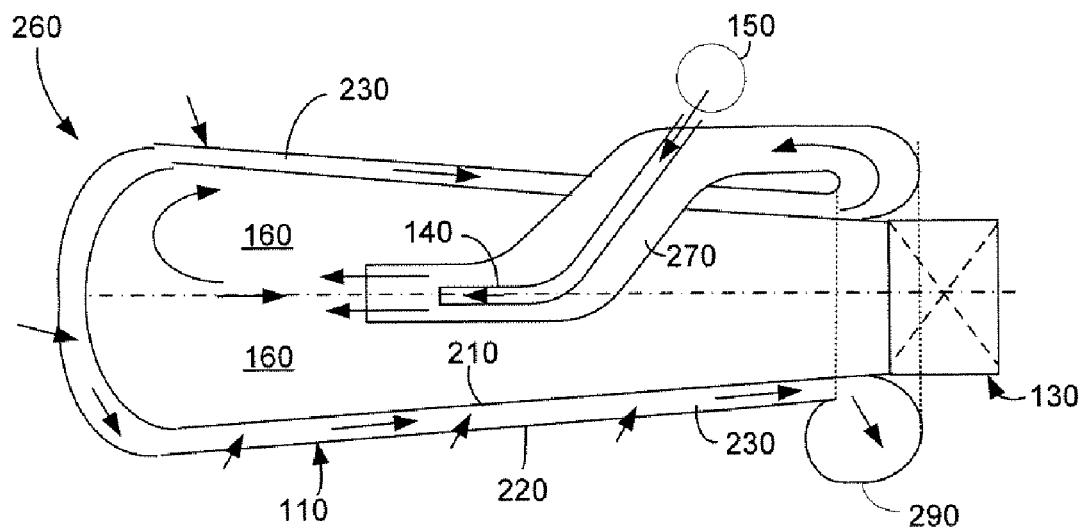
FIG. 6 is a side cross-sectional view of a combustor with an integral turbine nozzle showing a single tube, aft fed injection system.

FIG. 6 shows a combustion system 280 that is a further embodiment as is described herein. The combustion system 280 provides for a single tube, aft fed injection system. The combustion system 280 includes the combustor 110, the turbine nozzle 130, the liner 210, the impingement sleeve 220, and the airflow channel 230 as described above. In this example, a portion of the air entering the impingement sleeve 220 exits via a turbine plenum 290 while the remaining air is directed towards the intake air channel 270. The fuel injector 140 is positioned within the intake air channel 270 so as to provide the single tube injection process.

Figure 7:
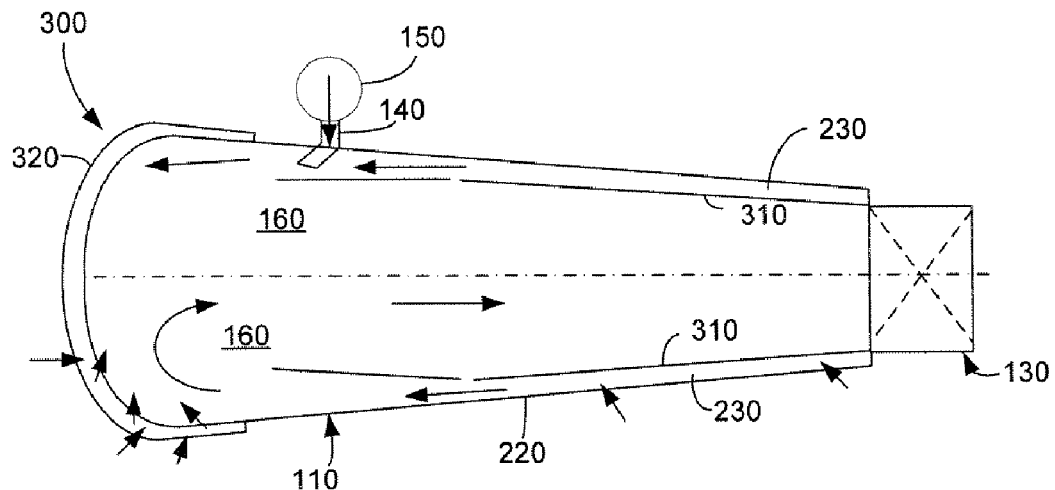
FIG. 7 is a side cross-sectional view of a combustor with an integral turbine nozzle showing a wall fed injection system.

FIG. 7 shows a combustion system 300 that is a further embodiment as is described herein. The combustion system 300 provides for a wall fed injection system. The combustion system 300 includes the combustor 100, and the turbine nozzle 130 as described above. The combustion system 300 also includes an inner liner 310. The inner liner 310 may not extend all the way about the combustor 110, but may terminate before the reaching the front end. The impingement sleeve 220 may surround the inner liner 310. The impingement sleeve 220 creates the airflow channel 230 about the inner liner 310. One end of the impingement sleeve 220 may be surrounded by an impingement/film cooling sleeve 320. The fuel injector 140 may be positioned at about the end of the inner liner 310. Air may enter from the airflow channel 230 from the impingement sleeve 220 or otherwise and may merge with air from the impingement/film cooling sleeve 320.

Figure 8:
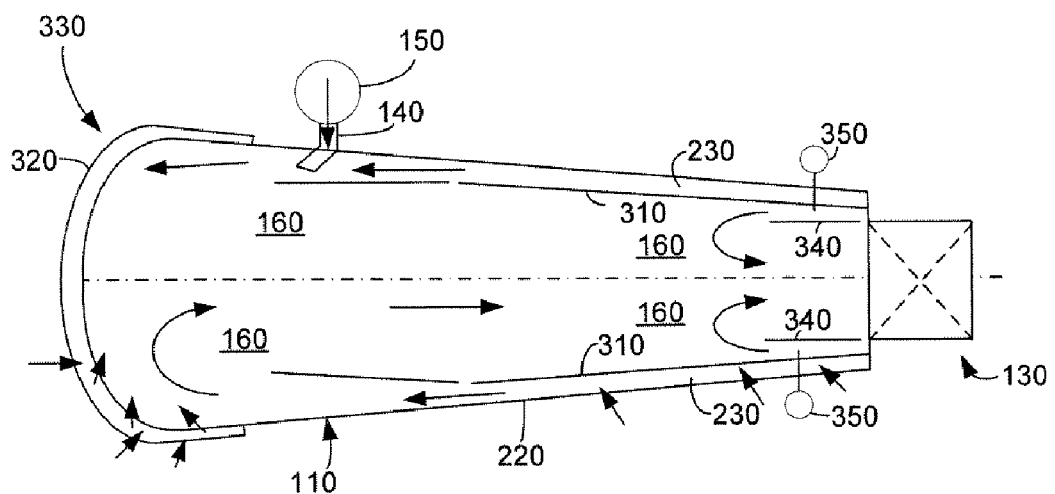
FIG. 8 is a side cross-sectional view of a combustor with an integral turbine nozzle showing a staged wall fed injection system.

FIG. 8 shows a combustion system 330 that is a further embodiment as is described herein. The combustion system 330 provides for a staged wall feed injection system. The combustion system 330 includes the combustor 110 and the nozzle 130 as is described above. The combustion system 330 also includes the inner liner 310, the impingement sleeve 220, the airflow channel 230, and the impingement/film cooling layer 320 of FIG. 7. The combustion system 330 also includes a second inner liner 340 and one or more secondary fuel supplies 350. In this example, the fuel injector 140 is again positioned at about the end of the inner liner 310. One of secondary fuel supplies 350 is positioned at about the end of the second inner liner 340 on one side of the combustor 110 while a further secondary fuel supply 350 may be positioned on the other side. The fuel and air from the second inner liner 340 may mix with the exhaust products at the other end of the combustor 110.

Figure 10:
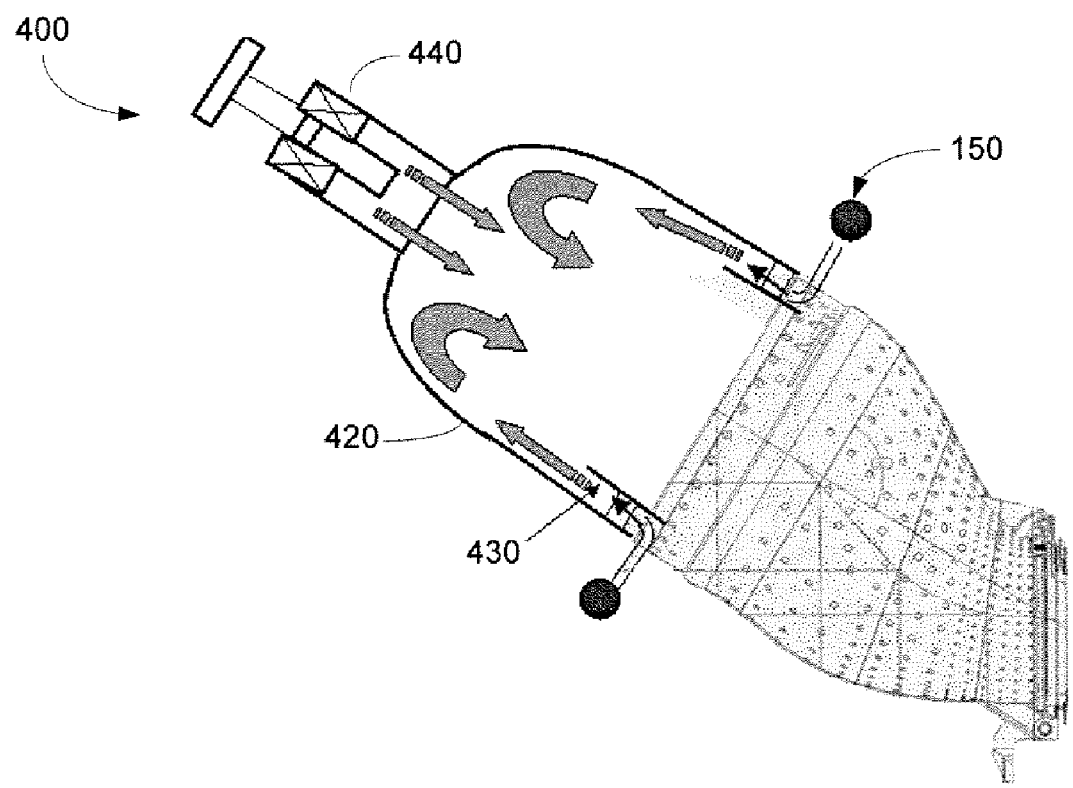
FIG. 10 is a side cross-sectional view of a retrofitted combustor.

FIG. 10 shows a further embodiment as is described herein, a combustion system 400. The combustion system 400 is a retrofitted can design. The combustion system 400 may use an existing transition piece 410 with a reverse flow combustor concept. An outer liner 420 replaces the existing cap and flow sleeve. Fuel is directed from the manifold 150 through an inner liner 430. A swozzle 440 is positioned on the other end of the liner 420 for injecting premixed air/fuel. (The term "swozzle" is a combination of the words "swirler" and "nozzle".) The combustion system 400 thus can be incorporated into many existing devices.

The combustion systems described herein provide significant benefits in terms of reduced physical size, complexity, part count, costs, and exhaust emissions relative to current combustion systems. These benefits are obtained in part by the close integration of the turbine nozzle 130 and the combustor 110 and by using the combustion airflow and fuel flow as a means of cooling the turbine nozzle 130. At the same time, system efficiencies as a whole are improved by using the turbine nozzle 130 for preheating the incoming fuel and air. The use of the reverse flow and the stagnation point 165 provides efficient fuel/air mixing, mixing of exhaust gases and incoming air, preheating of fuel and air streams, and short reaction zone residence time.

The combustion systems described herein also provide low NOx emissions without complex fuel/air mixtures and/or fuel staging. Single digit NOx ranges are possible with both gas and liquid fuels, potentially less than five (5) parts per million NOx. The small reaction zones 160 also promote "flameless" combustion (or widely distributed reaction zones), further lowering NOx emissions. Combustion noise also may be reduced. Damaging combustion noise also may be reduced or eliminated, improving combustion system durability and reliability.

With respect to size, about eighty percent (80%) of the combustion parts may be eliminated. Generally described, current end covers, casings, flow sleeves, inner/outer crossfire tubes, caps, liners, transition pieces, and individual fuel injectors may be eliminated. Fewer seals also may be required. In other words, while a typical combustion system may include more than 14,000 parts, the combustion systems described herein may have about 500 parts. The combustion systems described herein thus providing cost savings and size reduction. Existing turbine equipment also may be retrofitted.

Another benefit found herein is in the reduction of the surface area and the improvement in the surface to volume ratio for the liner 210 and other elements. This reduces the amount of dedicated liner cooling required and the associated metal temperatures. This further improves the overall durability of the elements described herein.

It should be apparent that the foregoing relates only to the preferred embodiments of the present invention and that numerous changes and modifications may be made herein without departing from the general spirit and scope of the invention as defined by the following claims and the equivalents thereof.

What is claimed is:

1. A gas turbine combustion system for burning air and fuel into exhaust gases, comprising: a combustor; a turbine nozzle integral with the combustor for directing the exhaust gases out of the combustor; an air intake for providing the air to the combustor; and a fuel injector for providing the fuel to the combustor; the air intake and the fuel injector concentrically positioned within the turbine nozzle at an exit end of the combustor, the air intake comprising a first tube concentrically positioned within the turbine nozzle and the fuel injector comprising a second tube concentrically positioned within the first tube within the turbine nozzle, such that one or both of the air and the fuel cool the turbine nozzle, a mixture of the air and the fuel flows in a first direction and the exhaust gases flow in a second direction.

2. The gas turbine combustion system of claim 1, wherein the second direction comprises a reverse direction to the first direction.

3. The gas turbine combustion system of claim 1, wherein the combustor comprises a reverse flow annular combustor.

4. The gas turbine combustion system of claim 1, wherein the turbine nozzle leads to a first stage of the turbine.

5. The gas turbine combustion system of claim 1, further comprising an impingement sleeve positioned about the combustor.

6. The gas turbine combustion system of claim 1, further comprising an airflow channel positioned about the combustor.

7. The gas turbine combustion system of claim 6, wherein air flows through the airflow channel in substantially the same direction as the exhaust gases in the second direction.

8. A gas turbine combustion system for burning air and fuel into exhaust gases, comprising: a reverse flow combustor; a turbine nozzle positioned at a downstream end of the combustor for directing the exhaust gases out of the combustor; a cooling airflow channel positioned about the combustor; one or more air intake channels positioned to communicate air from the cooling airflow channel into the combustor; and a fuel injector positioned within one of the one or more air intake channels for providing the fuel to the combustor, wherein the one or more air intake channels comprise a first tube concentrically positioned within the turbine nozzle and the fuel injector comprises a second tube concentrically positioned within the first tube within the turbine nozzle.

9. The gas turbine combustion system of claim 8, wherein the airflow channel leads to one or more turbine plenums.

10. The gas turbine combustion system of claim 8, wherein:
the airflow channel is positioned to direct air about the combustor from an upstream end of the combustor toward a downstream end of the combustor and into the one or more air intake channels; and
the one or more intake channels are positioned to direct the air into the combustor toward the upstream end of the combustor.

11. The gas turbine combustion system of claim 8, wherein the cooling airflow channel comprises an impingement sleeve positioned about the combustor.

12. The gas turbine combustion system of claim 8, wherein air flows through the airflow channel in substantially the same direction as an exhaust gases direction.

13. A method for burning air and fuel into exhaust gases in a gas turbine combustion system, comprising: providing air to the combustion system through an air intake, the air intake comprising a first tube concentrically positioned within the turbine nozzle; providing fuel to the combustion system through a fuel intake, the fuel intake comprising a second tube concentrically positioned within the first tube; premixing substantially all of the air and the fuel to create an air-fuel mixture; injecting the air-fuel mixture into the combustor in a direction traveling away from the turbine nozzle; reacting the air-fuel mixture in a reaction zone to create the exhaust gases; and reversing the flow of the exhaust gases to travel toward the turbine nozzle.

14. The gas turbine combustion system of claim 8, wherein the reverse flow combustor is generally annular in shape.

15. The method of claim 13, wherein the combustor is generally annular in shape.

16. The gas turbine combustion system of claim 8, wherein:
each of the one or more air intake channels comprises a turn that reverses the air so that the air enters the combustor in a direction traveling away from the turbine nozzle; and
the fuel injector is concentrically positioned within the one of the one or more air intake channels.

17. The method of claim 13, further comprising cooling the combustor with the air before the air is premixed with the fuel, by flowing the air about an exterior of the combustor in a direction traveling toward the turbine nozzle.

* * * * *